Sept. 17, 1946. A. T. PETERSON 2,407,767
PUSH MOWER
Filed May 15, 1942 2 Sheets-Sheet 1
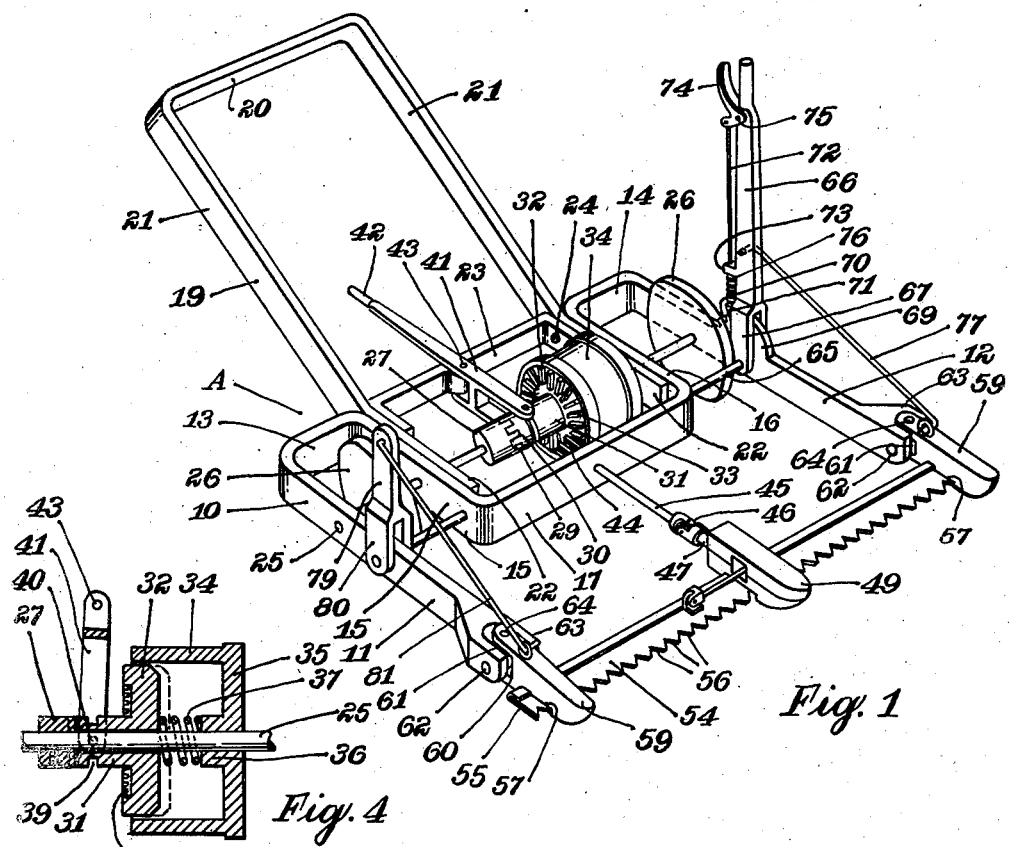
Fig. 1
Fig. 4
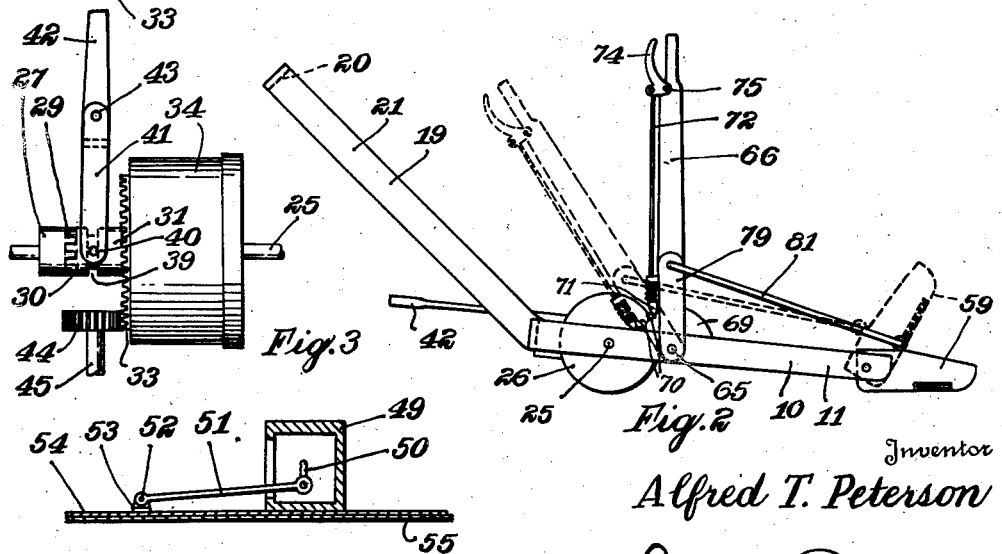
Fig. 3
Fig. 2
Fig. 5
Inventor
Alfred T. Peterson
By Robert M. Dunning
Attorney Sept. 17, 1946.  A. T. PETERSON  2,407,767
PUSH MOWER
Filed May 15, 1942  2 Sheets-Sheet 2
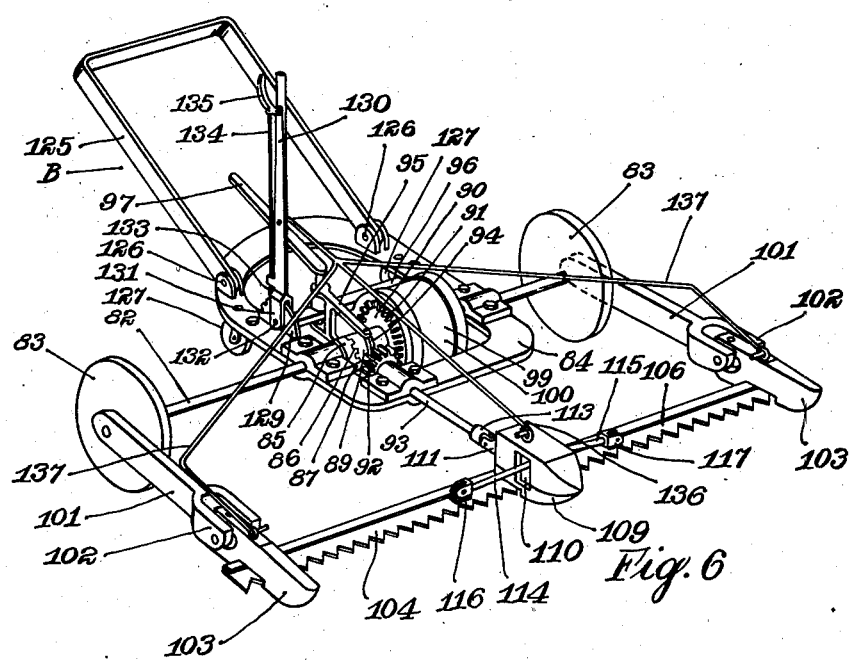
Fig. 6
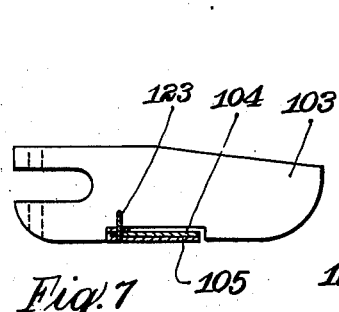
Fig. 7
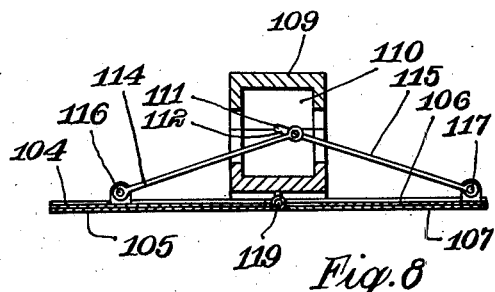
Fig. 8
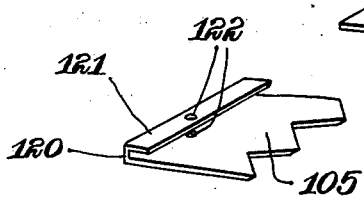
Fig. 9
Fig. 10
Inventor
Alfred T. Peterson
By Robert M. Dunning
Attorney Patented Sept. 17, 1946

2,407,767

UNITED STATES PATENT OFFICE 2,407,767

PUSH MOWER

Alfred T. Peterson, Minneapolis, Minn.

Application May 15, 1942, Serial No. 443,035

3 Claims. (Cl. 56—260)

My invention relates to an improvement in mowers, wherein it is desired to provide a mowing apparatus capable of cutting close to an obstruction.

It is the object of the present invention to provide a mowing apparatus which includes a pair of relatively reciprocable cutter elements which are mounted forwardly from the supporting apparatus so that grass or grain may be mowed extremely close to an obstruction. By providing the cutter elements on the forward end of the mower and by providing a suitable means by which the mower may be pushed, it is obvious that the cutter blades may be moved forwardly into close proximity with a wall or other obstruction. This construction saves considerable work in trimming grass or the like about such obstructions.

It is an object of the present invention to provide reciprocable cutter blade means supported by suitable wheels or rollers mounted on a frame extending rearwardly from the cutter blades. The wheels supporting the frame engage the ground so that as the mower moves over the ground the cutter blades are reciprocated through a suitable connecting mechanism.

A feature of the present invention resides in the fact that the cutter blades extend laterally beyond the support shoes so that the mower may be operated directly adjacent a wall or other obstruction. As the blade projects laterally beyond the sides of the supporting shoes, these blades may extend directly adjacent the wall or other projection, allowing the mowing operation to continue more closely adjacent the projection than has previously been possible.

A feature of the present invention lies in the transmission of the power from the supporting wheels of the device to the reciprocating blades through a clutch mechanism which permits disengagement of the driving power from the blades when it is so desired. Thus the mower may be pushed over the surface of the ground without reciprocating the blades when it is so desired.

A feature of the present invention resides in the provision of a simple and light weight mower which includes reciprocable blades which may, if desired, be provided in two relatively pivotal pairs. One pair of blades may reciprocate on one side of the center of the machine, while a second pair of blades may reciprocate on the opposite side of the machine. These sets of blades extend into engagement so that no strip of grass or grain is left uncut between the two pairs of blades. At the same time, however, one set of blades may pivot somewhat on a substantially horizontal axis with respect to the other pair of blades, so that the mower will follow closely the contour of the surface of the ground.

A further feature of the present invention lies in the provision of a means for swinging the cutter blades out of cutting position. The cutter blades are pivotally secured to the supporting frame and the blade operating means is connected through a universal joint. As a result, the entire blade may be swung from a substantially horizontal cutting position to a generally vertical inoperative position when the cutting operation of the blades is not desired.

A further feature of the present invention lies in the fact that the blades may be tilted upwardly at an angle to the horizontal when it is desired to cut grass or grain at a point somewhat spaced from the surface of the ground. By inclining the blades upwardly their cutting edges are raised somewhat from the surface of the ground permitting the cutting operation at a point substantially above the ground surface.

These and other objects and novel features of my invention will be more clearly and fully set forth in the following specification and claims.

In the drawings forming a part of my specification:

Figure 1 is a perspective view of a mowing machine showing the arrangement of the parts thereof.

Figure 2 is a side elevational view of the mowing device illustrated in Figure 1, showing in dotted outline the cutter blades in elevated position.

Figure 3 is a top plan view of the clutch device which may be used for disconnecting the blade reciprocating mechanism from the drive wheels.

Figure 4 is a sectional view transversely through the clutch mechanism shown in Figure 3.

Figure 5 is a vertical section through the center shoe containing the blade reciprocating mechanism.

Figure 6 is a perspective view of a modified form of construction of my mower.

Figure 7 is a sectional view on a vertical plane through one of the blade supporting shoes.

Figure 8 is a vertical section on a transverse plane through the center shoe of the mowing device shown in Figure 6, showing the blade reciprocating mechanism.

Figure 9 is a perspective view of one of the blade ends.

Figure 10 is a perspective view of the corresponding end of the cooperating blade.

The mowing machine A comprises a frame 10, which in the form illustrated includes a pair of side members 11 and 12, a pair of opposed transversely extending rear elements 13 and 14, a pair of forwardly extending members 15 and 16 connected at the inner ends of the members 13 and 14 and extending parallel to the side members 11 and 12, and a transversely extending connecting strip 17 connecting the forward ends of the members 15 and 16. In general shape this frame 10 thus comprises a U-shaped element having a substantially U-shaped offset portion in the base thereof.

A handle element 19, by means of which the device A may be pushed, may be of any desired shape, but is shown as being U-shaped in formation having a transverse base 20, parallel side bars 21, and angularly extending anchoring ends 22 which extend adjacent to the members 15 and 16 of the frame 10 and are bolted thereto. A transverse brace 23 extends between the anchoring ends 22 of the handle 19. This brace 23 is preferably substantially in alignment with the rear portions 13 and 14 of the frame 10 and is bolted to the frame by means of bolts 24, or other suitable means.

A shaft 25 extends transversely through the frame 10, being journaled in the side members 11 and 12, and in the frame members 15 and 16. Wheels or rollers 26 are mounted upon the shaft 25 and either or both of these wheels may be fixed to the shaft 25 to cause rotation of the shaft as the mower A is moved along the ground. The wheels 26 are designed to engage the surface of the ground and to be rotated by contact therewith.

Also mounted upon the shaft 25 between the frame portions 15 and 16, I provide a collar 27 which is keyed or otherwise affixed to the shaft 25. A series of clutch teeth 29 are provided on the collar 27, which teeth cooperate with suitable teeth 30 on a collar 31. The collar 31 forms a hub for the disc or plate 32 which supports the gear teeth 33. The disc or plate 32 is supported within the cylindrical shell 34 of a clutch housing which is connected by the disc 35 to the hub 36. A spring 37 is interposed between the hub 36 and the plate or disc 32 so as to urge the disc and collar 31 into engagement with the collar 27. In other words, the teeth 29 and 30 on the collars 27 and 31 respectively are normally held in engagement by the spring 37. A groove 39 in the collar 31 embraces the shift rollers 40 mounted upon the yoke 41, by means of which the position of the collar 31 may be changed. A handle 42 is provided on the yoke 41 to permit the pivoting of the yoke 41 about its vertical pivot 43. Obviously when the handle 42 is operated to pivot the yoke 41, the teeth 29 and 30 on their respective collars may be disengaged.

A pinion or beveled gear 44 is mounted on a shaft 45 which extends forwardly or substantially parallel to the side members 11 and 12 of the frame. This pinion 44 normally engages the gear teeth 33, but this gear is disengaged from the teeth 33 by operation of the yoke handle 42. Thus the driving action of one or both of the wheels 26, which is transmitted through the shaft 25 to the collar 27, may, or may not, rotate the shaft 45, depending upon the position of the collar 31 and the shifting yoke 42 which operates the clutch.

The shaft 45 extends through the transverse element 17 of the frame and is connected through a universal joint 46 to a crank shaft 47. The crank shaft 47 extends through the rear end of a center shoe 49 and is provided with a crank 50 which rotates within the hollow shoe. A connecting rod 51 is mounted at one end upon the crank 50 and is pivotally attached at 52 to a bracket 53 mounted upon a reciprocable cutter blade 54. A stationary blade 55 operates in conjunction with the movable blade 54. The blades 54 and 55 bear spaced teeth such as 56, which act to cut grass or grain passing between the same.

The blades 54 and 55 extend laterally beyond the side members 11 and 12 of the frame 10 extending through notches 57 in the supporting shoes 59. The shoes 59 are notched at 60 to admit a transversely extending element 61 which is pivoted at 62 between the opposed ends of the bifurcated forward ends 63 of the frame members 11 and 12. Pivots 64 extend through the shoes 59 and through the transverse element 61 in a manner to provide a universal joint connecting the shoes to the forward ends of the frame elements 11 and 12.

A shaft 65 extends through the frame 10 parallel to the shaft 25. An operating lever 66 is provided with a forked end 67 which straddles the side element 12 of the frame. An arcuated segment 69 is provided on the frame side 12 and notches 70 in the segment 69 may be engaged by a dog 71 mounted on the end of a rod 72. The rod 72 is journaled in an ear 73 on the lever 66 and is operated by a hand lever 74 pivoted to the lever 66 at the point 75. By pivoting the hand lever 74 toward the handle the spring 76 may be compressed to withdraw the dog 71 forming a selected notch 70 in the segment 69.

A link 77 pivotally connects the lever 66 to one of the shoes 59. An arm 79 is mounted on the opposite end of the shaft 65, this arm 79 having a forked end 80 which straddles the side member 11 of the frame 10. A link 81 pivotally connects the arm 79 with the other of the shoes 59.

In operation, the handle lever 74 is operated to retract the dog 71 and the lever 66 may be pivoted, thus acting to pivot the shaft 65. The lever 66 and the arm 79 are thus pivoted in unison with the links 77 and 81, acting to pivot the shoes 59 upwardly, as indicated in dotted outline in Figure 2 of the drawings. By elevating the cutter blades 54 and 55 to a slight extent, the grass or grain may be cut off at a considerable distance from the surface of the ground.

In Figures 6 through 8 of the drawings, I disclose a modified form of construction of mower which is indicated in general by the letter B. The mower B includes a transversely extending shaft 82 having a pair of wheels or rollers 83 mounted thereupon. Either one or both of the wheels or rollers 83 are mounted to rotate with the shaft 82, so as to provide a drive mechanism for the cutter blades. A loop-shaped frame 84 is supported upon the shaft 82 and a collar 85 is mounted on the shaft 82 within the frame 84. The collar 85 is mounted to rotate with the shaft 82 and is provided with teeth 86 which are designed to engage with cooperable teeth 87 on the collar 89. The collar 89 forms the hub, and a disc 90 which is similar to the disc 32 illustrated in Figure 4. Gear teeth 91 are provided on the disc 90, which teeth are engageable with the teeth of a pinion 92. The pinion 92 is mounted upon a shaft 93 which projects forwardly from the frame 84, as will be later described.

A groove 94 in the collar 89 embraces pins or rollers supported by a yoke 95 which is pivotally mounted upon a cooperating member 96 of the frame 84. A handle 97 on the yoke 95 permits the pivoting of the yoke so as to slide the collar 89 and disc 90 to disengage the teeth 86 and 87 and also to disengage the gear teeth 91 from the pinion 92. The disc 90 preferably acts as a closure for the cylindrical shell 99 of the clutch housing 100 which is supported at its opposite end upon the shaft 82 similar to the manner in which the housing 34 is supported upon the shaft 25. A spring identical to the spring 37 shown in Figure 4 normally urges the teeth 86 and 87 into engagement.

Extending forwardly from the shaft 82 I provide a pair of ears 101 which are equipped with bifurcated ends 102. A pair of shoes 103 are universally mounted within the bifurcated ends 102 and are designed to slide along the surface of the ground. These shoes 103 act to support the cutter blades 104, 105, 106, and 107, as will be noted in the drawings.

A central shoe 109 is provided with a hollow interior 110 which contains a crank shaft 111 provided with a crank 112. The crank shaft 111 is connected to the forwardly extending shaft 93 through the universal joint 113. Connecting rods 114 and 115 are mounted upon the crank 112 and the ends of these connecting rods are pivotally attached at 116 and 117 to the movable blades 104 and 106. The blades 104 and 106 are reciprocable with respect to the blades 105 and 107. The adjacent ends of the blades 105 and 107 are hingedly connected at 119 to the lower surface of the body 109. The blades 105 and 107 are connected to the shoes 103 in any suitable manner, such as is disclosed in Figure 7 of the drawings. In this figure, I disclose an upstanding flange 120 extending along the rear edge of the blade 105 and a flange 121 on this upstanding flange 120 which is parallel and in spaced relation to the blade 105. Aligned openings 122 are provided in the blade 105 and in the flange 121. A bolt 123 extends through the aligned openings 122 and into the shoe 103 to hold the blade 105 in place.

A slot 124 in the blade 104 permits the insertion of the bolt 123 therethrough, permitting a longitudinal sliding of the blade 104 while holding the blades in proper relationship. Obviously the blade 107 is formed similarly to the blade 105 and the blade 106 is attached thereto in any convenient manner.

A handle 125 is secured by fixed pivots 126 to the frame 84. This handle may be of any suitable type. Caster rollers 127 are mounted beneath the frame 84 to support the frame and to allow the same to flex with respect to the ground.

An arcuated segment 129 is provided upon the frame 84 extending in a vertical longitudinally extending plane. A lever 130 is provided with a bifurcated end 131 which is pivoted at 132 to this segment 129. A dog 133 is mounted upon a slidable rod 134 which is reciprocated by a hand lever 135 pivoted to the lever 130. A spring, similar to the spring 76 illustrated in Figure 1 of the drawings, urges the dog 133 into engagement with notches in the segment 129.

A link 136 is loosely pivotally connected at one end to the shoe 109 and at its opposite end to the lever 130. Branch links 137 connect the link 136 to the shoes 103. Thus by operating the lever 130 the shoes 103 may be tilted upwardly either to space the cutter blades away from the surface of the ground or to place the cutter bar in an inoperative position.

It will be noted that the blades 104, 105, 106, and 107 project laterally beyond the shoes 103 so that the ends of the blade may extend closely adjacent a wall or other obstruction. Thus, it will be seen that the mower will cut directly adjacent an obstruction which is important in a device of this type. It will be noted that the mower B is provided with blades which conform to the contour of the ground and therefore the blades can be of a substantial length.

In accordance with the patent statutes, I have described the principles of construction and operation of my mowing device and while I have endeavored to set forth the best embodiments thereof, I desire to have it understood that obvious changes may be made within the scope of the following claims without departing from the spirit of my invention.

I claim:

1. A mower comprising a frame, a pair of arms extending forwardly from said frame, a pair of forwardly extending shoes pivotally mounted to said frame by universal pivots, an intermediate shoe positioned between said first named shoes, fixed cutter blades pivoted to said intermediate shoe along a longitudinal axis and connected to said first named shoes, relatively reciprocable cutter blades mounted adjacent said fixed cutter blades, means on said intermediate shoe for actuating said reciprocable cutter blades, a shaft extending from said actuating means, and a universal pivot in said shaft in substantial alignment with said first named universal pivots, said shoes being simultaneously pivotal about a transverse horizontal axis when said universal pivots are aligned.

2. A mower comprising a frame, a pair of shoes pivotally connected to said frame by universal pivots, an intermediate shoe between the shoes of said pair, fixed cutter blades pivotally secured along a longitudinal axis to said intermediate shoe and secured to the shoes of said pair, reciprocable cutter blades mounted adjacent said fixed cutter blades, means on said intermediate shoe for actuating said reciprocable cutter blades, drive shaft means for said actuating means, means driving said shaft, and a universal pivot in said shaft in substantial alignment with the universal first named attachment of said shoes, said shoes being simultaneously pivotal about a transverse horizontal axis when said universal pivots are aligned.

3. A mower comprising a frame, a pair of arms extending forwardly from said frame, a pair of forwardly extending shoes pivotally mounted to said frame by universal pivots, an intermediate shoe positioned between said first named shoes, fixed cutter blades pivoted to said intermediate shoe along a longitudinal axis and connected to said first named shoes, relatively reciprocable cutter blade mounted adjacent said fixed cutter blades, means on said intermediate shoe for actuating said reciprocable cutter blades, a shaft extending from said actuating means, a universal pivot in said shaft in substantial alignment with said first named universal pivots, and lever means connected to said shoes for pivoting the same in unison, said shoes being simultaneously pivotal about a transverse horizontal axis when said universal pivots are aligned.

ALFRED T. PETERSON.